United States Patent
Harrison et al.

(10) Patent No.: US 6,604,235 B1
(45) Date of Patent: Aug. 5, 2003

(54) OPERATING SYSTEM UPGRADING

(75) Inventors: Robert G. Harrison, Seattle, WA (US); Daniel W. Knodle, Seattle, WA (US); Kenneth A. Brown, La Mesa, CA (US); Kirk Westfall, San Diego, CA (US); Robert Rogers, Cardiff, CA (US)

(73) Assignee: Icebox, LLC, Lake Forest, IL (US)

( * ) Notice: Subject to any disclaimer, the term of this patent is extended or adjusted under 35 U.S.C. 154(b) by 0 days.

(21) Appl. No.: 09/478,922

(22) Filed: Jan. 6, 2000

Related U.S. Application Data
(60) Provisional application No. 60/115,008, filed on Jan. 6, 1999.

(51) Int. Cl.$^7$ .............................................. G06F 9/44
(52) U.S. Cl. ...................... 717/168; 717/169; 717/178; 717/175; 709/322
(58) Field of Search ................................. 717/168, 169, 717/170, 174, 178, 172, 175; 709/322; 714/36; 369/53.2

(56) References Cited

U.S. PATENT DOCUMENTS

| | | | |
|---|---|---|---|
| 5,596,639 A | * 1/1997 | Kikinis ........................... 705/52 |
| 5,666,293 A | * 9/1997 | Metz et al. ................... 709/220 |
| 5,724,102 A | 3/1998 | Harrison et al. |
| 5,751,369 A | 5/1998 | Harrison et al. |
| 5,842,024 A | * 11/1998 | Choye et al. ................ 717/178 |
| 5,889,990 A | * 3/1999 | Coleman et al. ............. 709/322 |
| 6,138,271 A | * 10/2000 | Keeley ......................... 717/140 |
| 6,240,550 B1 | * 5/2001 | Nathan et al. ................ 717/179 |
| 6,301,612 B1 | * 10/2001 | Selitrennikoff et al. ...... 709/220 |
| 6,327,652 B1 | * 12/2001 | England et al. ................. 713/2 |
| 6,389,591 B1 | * 5/2002 | Andrew ........................ 717/169 |
| 6,421,777 B1 | * 7/2002 | Pierre-Louis et al. ........... 713/2 |
| 6,496,977 B1 | * 12/2002 | Hamilton et al. ........... 717/168 |

OTHER PUBLICATIONS

Title: A non □ stop updating technique for device driver programs on the IROS platform, author: Araki, H. et al, IEEE, 1995.*
Title: Runtime software reorganization by traditional OS features, author: Nagamatsu et al, IEEE, 2000.*
Title: Performance considerations for an operating system transaction manager, author: Kumar et al, IEEE, Jun. 1989.*
Title: SROS: a dynamically □ scalable distributed real □ time operating system for ATM switching network, Author: Jun et al, IEEE, 1998, pp.: 2918 □ 2923 vol. 5.*
Title: Operating Systems, author Shaw, ACM, Mar. 1998, vol. 31, No. 3.*

* cited by examiner

*Primary Examiner*—Gregory Morse
*Assistant Examiner*—Chameli C. Das
(74) *Attorney, Agent, or Firm*—Sonnenschein Nath & Rosenthal (57) ABSTRACT

Methods for upgrading the operating system of an appliance and/an one or more applications run by the appliance. The method can be used to reload existing software, to add an operating mode to the appliance, and/or to enable an existent but previously disabled operating mode of the appliance. Also disclosed are methods for making a laser readable disk which is used in the upgrading process and which also can be encoded with an operating system and/or application software.

6 Claims, 7 Drawing Sheets

OPERATING SYSTEM UPGRADING

RELATION TO ANOTHER APPLICATION

This application is related to provisional application No. 60/115,008. The benefit of the filing date of the provisional application is claimed, filed Jan. 6, 1999.

TECHNICAL FIELD OF THE INVENTION

The present invention relates to novel, improved appliances with upgradable operating systems and to methods for upgrading those operating systems.

BACKGROUND OF THE INVENTION

U.S. Pat. No. 5,724,102 issued Mar. 3, 1998 and U.S. Pat. No. 5,751,369 issued May 12, 1998, and U.S. patent application Ser. No. 09/046,947 disclose certain new and novel products (or appliances) which feature an integrated module having: (a) a player for an optically readable, encoded data storage device such as a video compact disk, an audio compact disk, a laser disk, or a digital video disk; (b) a player for retrieving data from the disk; and (c) a television receiver with a screen on which the retrieved information can be displayed.

The products in this family have user-selectable operating modes in which the appliance is operative to carry out a different function called up by choosing the appropriate user-selectable mode. Examples of the operating modes built into various modules are:

| Mode | Function |
| --- | --- |
| ENTERTAINMENT | Allows the user to watch television or play a video disk or tape |
| CD | Selected information is retrieved from the disk and displayed statically on the screen of the system or presented as a video for visual and audible reception, often as a demonstration of a technique for performing a particular task or a step of that task. Conventional audio CD's can also be played in this mode of operation |
| APPLIANCE | Gives the integrated module control over one or more appliances - as examples only, a kitchen range or refrigerator, a central heating system, an air conditioner, or a central vacuuming system. Also, diagnostic information on the controlled appliance(s) may be gathered and made available on the display screen of the appliance and at a service or repair facility |
| SECURITY | Allows one to visually identify and converse with a person at an entry way and unlock the door at the entry way, all from the location of the appliance |
| INTERNET | Allows a user to log onto and navigate the Internet and to send e-mail messages over the Internet |

For a variety of reasons, such as cost and the requirements of particular markets, not every product of the character described above will have all of the listed modes of operation or, in other instances, one or more modes may be disabled. However, one may wish to add one or more additional operating modes to an existing unit or to enable a disabled mode of operation.

SUMMARY OF THE INVENTION

There have now been invented and disclosed herein certain new and novel appliances of the character described above and so configured that the operating system of the unit can be upgraded to provide one (or more) additional modes of operation, either by adding the wanted mode of by enabling a previously unavailable mode.

These systems are upgraded by loading and running a disc with a program containing the operating system and application software needed to furnish wanted additional mode(s) of operation of the appliance. A disk as just described can also be employed to reload an existing program, for example, if the supply of power to the appliance is interrupted while a program is being loaded or if a power surge during the loading process results in one or more bits being lost.

Advantage can be taken of existing software in a novel process invented to produce disks of the character described above. This significantly reduces the costs of making the disks.

At the same time, flexibility in the data available from the disk is provided by a novel software package employed in conjunction with the existing software. For example, the just mentioned software package allows a disk to be encoded so that an advertiser's message will appear on the screen of an appropriately configured appliance when the user selects its INTERNET mode of operation. The software can also be employed to encrypt the data read to the disk, to update an existing program, and/or to convert data available in one format to a different format which allows the data to be burned into a master disk under the control of also conventional software.

Another advantage of the novel operating system upgrading methods disclosed herein is ease of operation. All the user need do is load the disk and then press a single, PLAY (or equivalent) button. From that point the installation of the program proceeds automatically.

The novel appliances disclosed herein have instructions stored in flash (or other non-volatile) memory that calculates an error detecting checksum each time the unit is powered up. A second checksum, one of the data on the laser readable disk, is calculated when the disk is loaded and the PLAY button is pushed. This ensures that a program with a defect identified by the checksum calculation is not loaded into the memory of the appliance.

Still another advantage of the novel appliances disclosed herein is that only a very simple loader needs to be permanently retained (or locked) in the non-volatile memory of the appliance. The only function of this routine is to load a second more robust loader into memory from the laser readable disk. The more robust loader then loads the program stored on the encoded disk into the non-volatile memory.

The objects, features, and advantages of the invention will be apparent to the reader from the foregoing and the appended claims and as the ensuing detailed description and discussion of the invention proceeds in conjunction with the accompanying drawing.

DETAILED DESCRIPTION OF THE INVENTION

Figure 1:
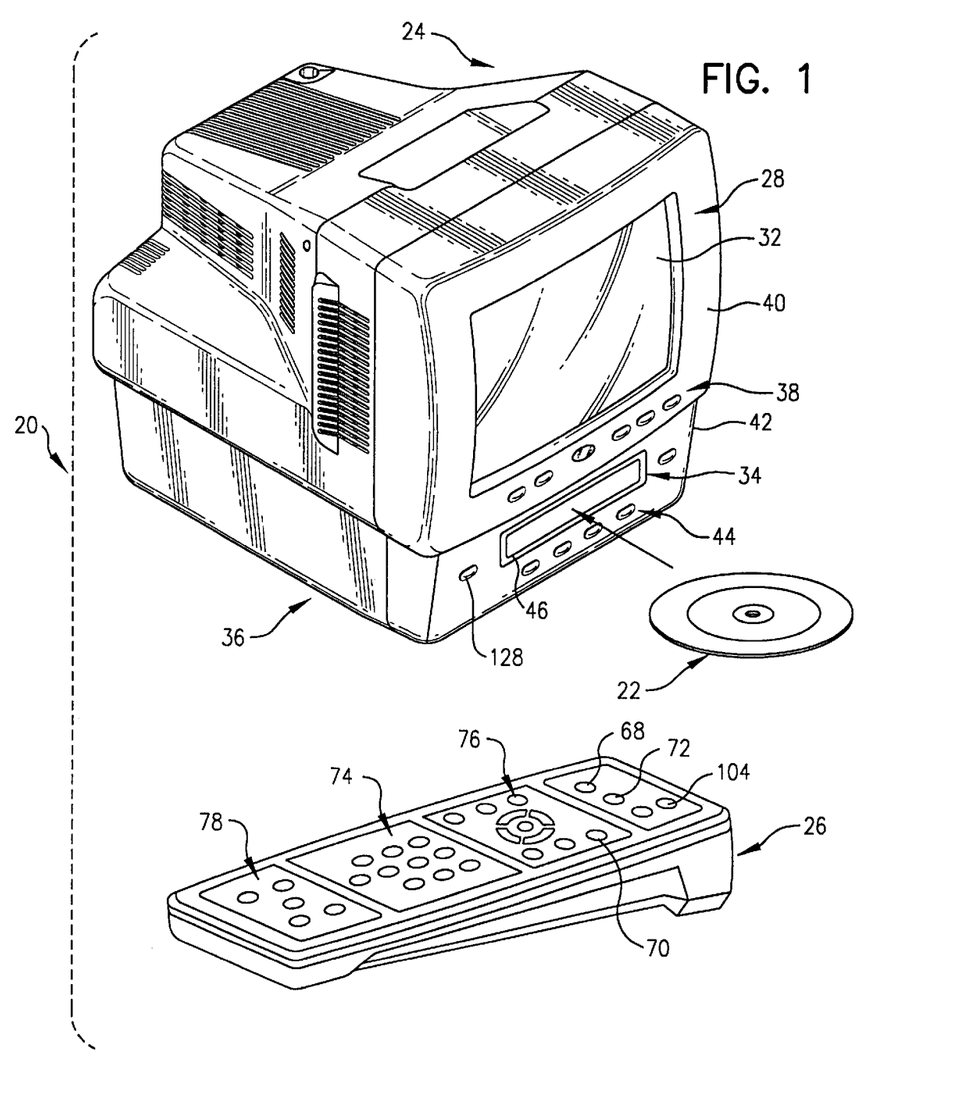
FIG. 1 depicts, pictorially: an appliance embodying the principles of the present invention, a laser readable disk which can be played by the appliance, and a remote control for operating the appliance.

Referring now to the drawing, FIG. 1 depicts a system 20 so constructed that one can easily, and at any time, switch between: (a) watching television or playing a video disk (or VHS cassette if a VCR is hooked up to the appliance) in an ENTERTAINMENT mode of operation; (b) a CD mode of operation in which an audio disk can be played or information stored on a Video 1.1, Video 2.0, CD, or other interactive optically readable disk 22 and retrieved and presented in a visual or visual/audio format; and (c) an INTERNET mode in which a system user can log onto and navigate the Internet or send an e-mail.

The major components of system 20 are an integrated unit (or module) 24, a remote control 26, and the above-mentioned optically readable disk 22.

Integrated unit 24 includes: (1) a television unit 28 which has a CRT (cathode ray tube) 30 with a screen 32, and (2) a video compact disk player 34. The television set and disk player are housed in the same cabinet 36. Conventional onboard controls 38 for television unit 28 are located on the front panel 40 and the right-hand side panel 42 of cabinet 36, and onboard controls 44 for disk player 34 are also located on front panel 40. A conventional tray 46 is used to load disk 22 into player 34.

Figure 2:
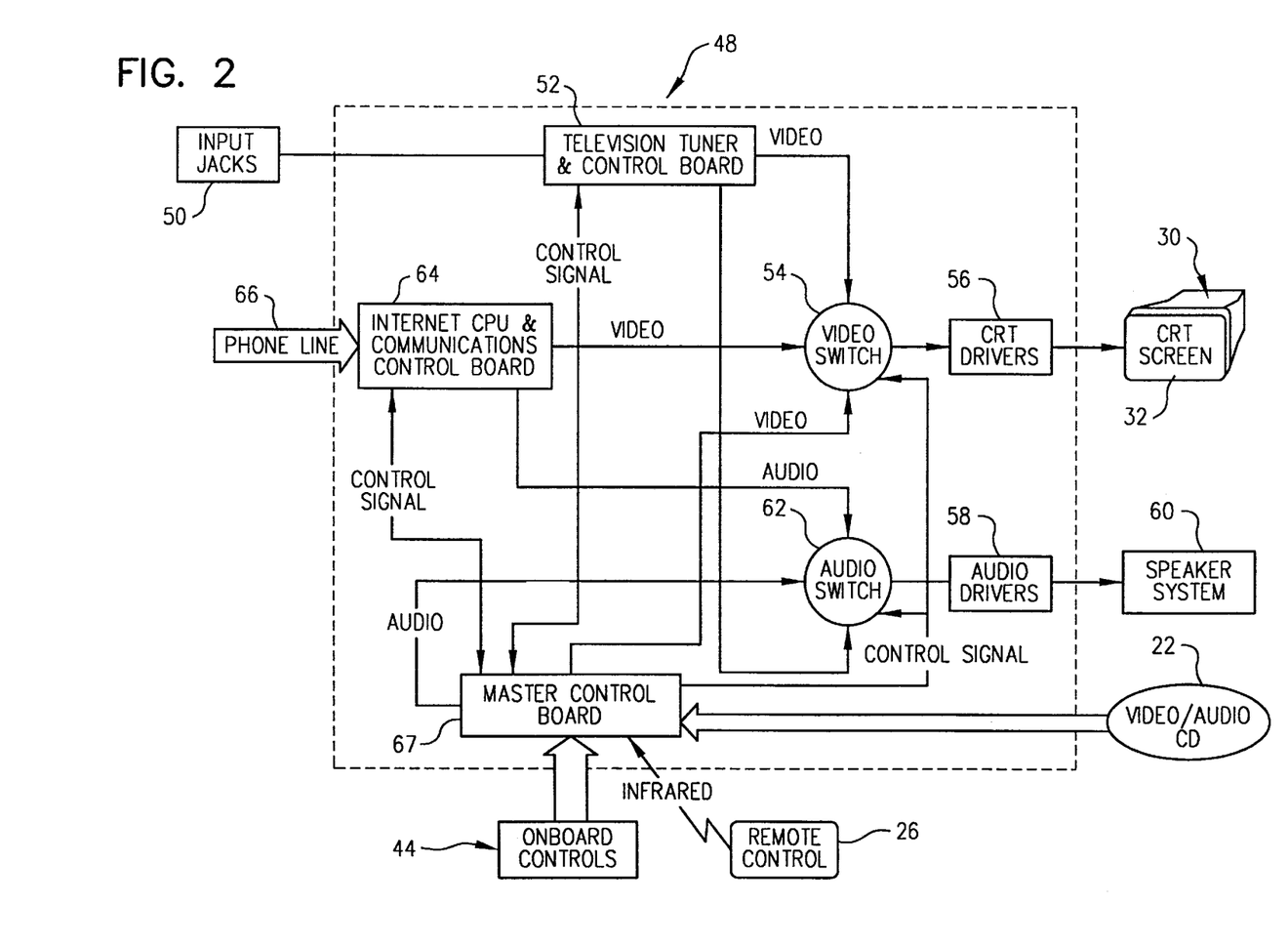
FIG. 2 shows, schematically, the components of the FIG. 1 appliance.

The components of integrated unit 24, depicted schematically in FIG. 2, are collectively identified by reference character 48. These components include input jacks 50, which are employed to connect integrated unit 24 to a television signal source—a television antenna or cable and/or a VCR. A tuner/control board 52 coupled to user actuable onboard controls 38 and to the hereinafter described push button controls of remote control 26 is employed to select one of the available television channels to watch or the VCR channel (usually 3 or 4) at the user's location. With system 20 operating in the ENTERTAINMENT mode of operation, the off-the-air or VCR signal is directed through a video switch 54 to CRT driver 56. The driver transmits to CRT 30 signals, which can be converted by that system component to visual images. The visual images are displayed on the CRT screen 32 of television unit 28.

The incoming signal typically also includes an audio component which is converted to audible sound by audio driver 58 and the illustrated stereo speakers 60. An audio switch 62 couples the audio driver 58 to the television source when the system user selects the ENTERTAINMENT mode of system operation.

Selection of the CD mode of operation resets video switch 54 and audio switch 62 to transmit information retrieved from an optically readable disk 22 to CRT screen 32 and to stereo speakers 60. This disk may be, as one example, a conventional audio CD disk, with the data being converted into an audio output.

Alternatively, in the CD mode of operation of system 20, data representing visual components of information are read from an appropriately encoded disk 22, decoded, and displayed on CRT screen 32 of integrated unit 24. Audio components of the information retrieved from disk 2, are converted to audible sound by stereo speakers 60.

Disk player 34, which is per se not part of the present invention, has a conventional mechanism (not shown) for spinning optically readable disk 22 and an equally conventional laser pickup (likewise not shown) for reading information stored in digital data files in the tracks on disk 22. That decoded data representing visual information is routed through video switch 54 and CRT driver 56 to CRT 30 and there converted to signals which appear as dynamic or static visual images on screen 32. Audio components of the retrieved information are routed through audio switch 62 and audio driver 58 to stereo speakers 60.

The components of integrated unit 24 also include a phone modem (not shown) which is incorporated in Internet CPU/Communications Control Board 64. The user of system 20 can log onto the Internet through this modem over telephone line 66 when integrated unit 24 is operating in the INTERNET mode and the video and audio switches 54 and 62 are consequently (and automatically) set to route signals from the modem to CRT driver 56 and stereo speaker system 60.

The operation of Internet CPU/Communications Control Board 64, disc player 34, and television tuner/control board 52 as well as the settings of video and audio switches 54 and 62 for the ENTERTAINMENT, CD, and INTERNET modes of operation of system 20 are regulated by master control board 67. This module component also performs data decoding, signal/processing, and other herein discussed functions involved in the operation of system 22. For example, master control board 67: (1) controls the reading of, and accepts data from, optically readable disk 22, and (2) accepts control signals from: onboard controls 44 or remote control 26, television tuner/control board 52, and Internet CPU/Communications Control Board 64.

Figure 3:
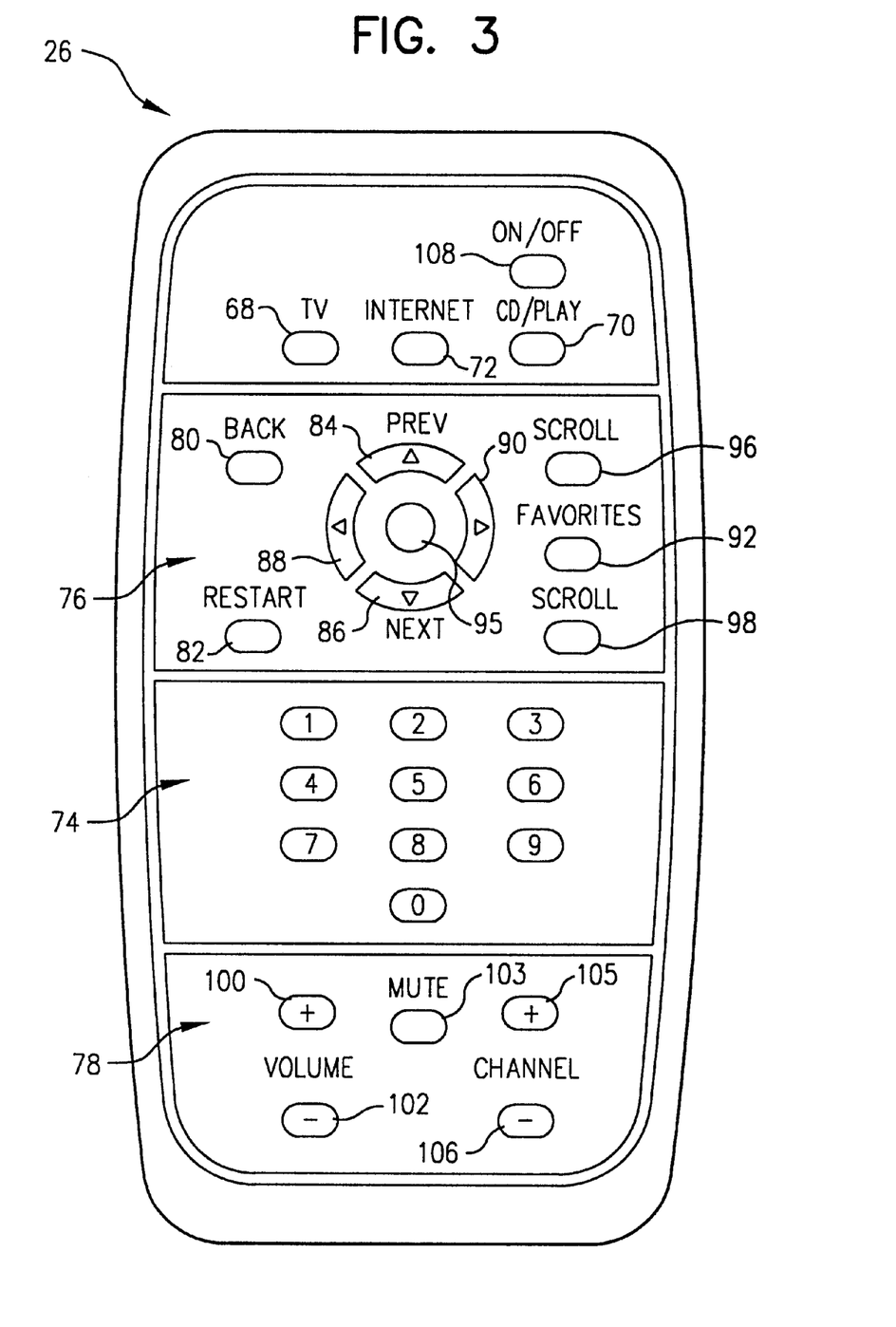
FIG. 3 is a plan view of the FIG. 1 remote control.

The ENTERTAINMENT, CD, and INTERNET modes of operation may be selected by the user of system 20 with push button controls 68, 70, and 72 of remote control 26. Remote control 26 also has a numerical keypad 74 with push buttons ① through ⓪ and two groups of push buttons respectively identified by reference character 76 and 78.

Push button group 76 includes BACK, RESTART, PREV (previous), and NEXT buttons 80, 82, 84, and 86, which are employed by the system user in the CD mode of operation. Buttons 84 and 86 are multifunctional, being also used in the INTERNET mode of operation, as UP and DOWN arrow buttons. Also employed in the INTERNET mode of operating mode are LEFT and RIGHT arrow buttons 88 and 90, FAVORITES button 92, and UP and DOWN scroll buttons respectively identified by reference characters 96 and 98.

Push button group 78 includes push button controls utilized in the ENTERTAINMENT operating mode of system 20. These include volume UP and DOWN buttons 100 and 102, a mute switch button 103, and CHANNEL selection push buttons 105 and 106, all having conventional functions.

Remote control 26 also has an ON/OFF button 108 which turns off television unit 28 and stereo speaker system 60 leaves otherwise but integrated unit 24 powered up. This allows the system user to retrieve e-mail and other information over the Internet even if the video and the audio functions are turned off.

The specific construction of remote control 26 and the details of integrated unit 24 are not part of the present invention and accordingly do not appear in the specification or the accompanying drawings. To the extent that such information is of interest to the reader, it may be found in the above-cited U.S. Pat. No. 5,724,102. That patent is hereby incorporated herein by reference.

The foregoing discussion of system 20 assumes that the operation is controlled with remote 26. The operation can equally be controlled by onboard controls appropriately included in control complement 44.

As discussed above, one of the important features of the present invention is that the operating system of integrated unit 24 can be upgraded. For the purpose of illustration and in the interest of brevity and clarity, it is assumed: that this is to be done to add to integrated unit 24 the APPLIANCE mode of operation described in corresponding application Ser. No. 09/116,785 filed Jul. 16, 1998, and (2) that system 20 includes the components necessary for this mode of operation including a phone modem hooked up as described in the '785 application and memory in which appliance condition and status data can be stored.

Figure 4:
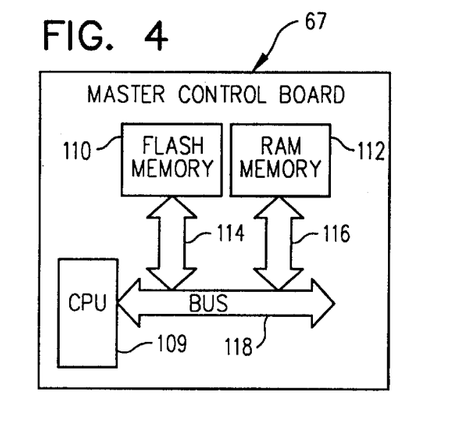
FIG. 4 shows, schematically, certain elements of a master control board which is depicted in block diagram form in FIG. 2 and is a component of the FIG. 1 appliance.

Referring now to FIG. 4, the master control board 67 of module 24 includes a CPU 108, flash memory 110 and RAM 112 as well as a number of other components which are not germane to an understanding of the present invention and have accordingly not been shown in the drawings.

Data is transferred from flash memory 110 and RAM 112 to CPU 108 and from the CPU to flash memory and RAM over buses 114, 116, and 118.

Figure 5:
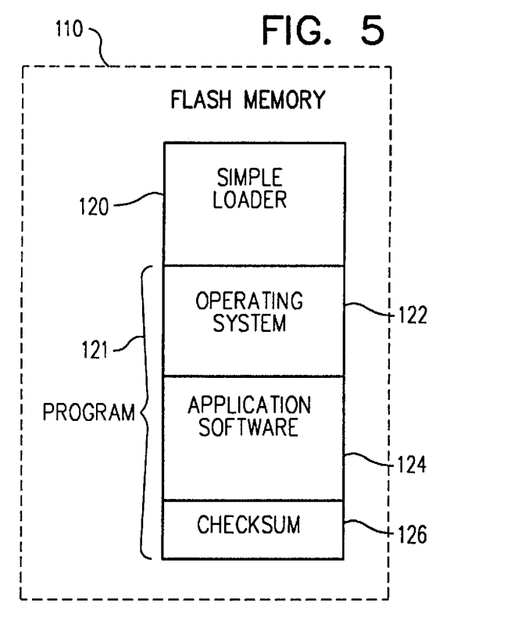
FIG. 5 depicts, pictorially, the contents of a flash memory component of the master control board.

A simple loader 120; a program 121 consisting of an operating system 122, and application software 124; and the instructions for calculating a checksum 126 (see FIG. 6) of the data stored in memory reside in flash memory. Loader 120 is locked—i.e. permanently stored—in flash memory 108. When module 24 is turned on, operating system 122 and application software 124 are loaded from flash memory 110 into RAM memory 112 to calculate the fore-mentioned checksum and to run the application software. Specifically, and with reference to FIG. 7, turning unit 24 on results first in the operating system with its included checksum calculation instructions being loaded into RAM 112 and in the checksum of the software in flash memory 110 being calculated. Unless an error is detected, booting of the integrated unit is continued by completing the loading of the operating system and application software in to RAM 112 and running the application software.

Figure 7:
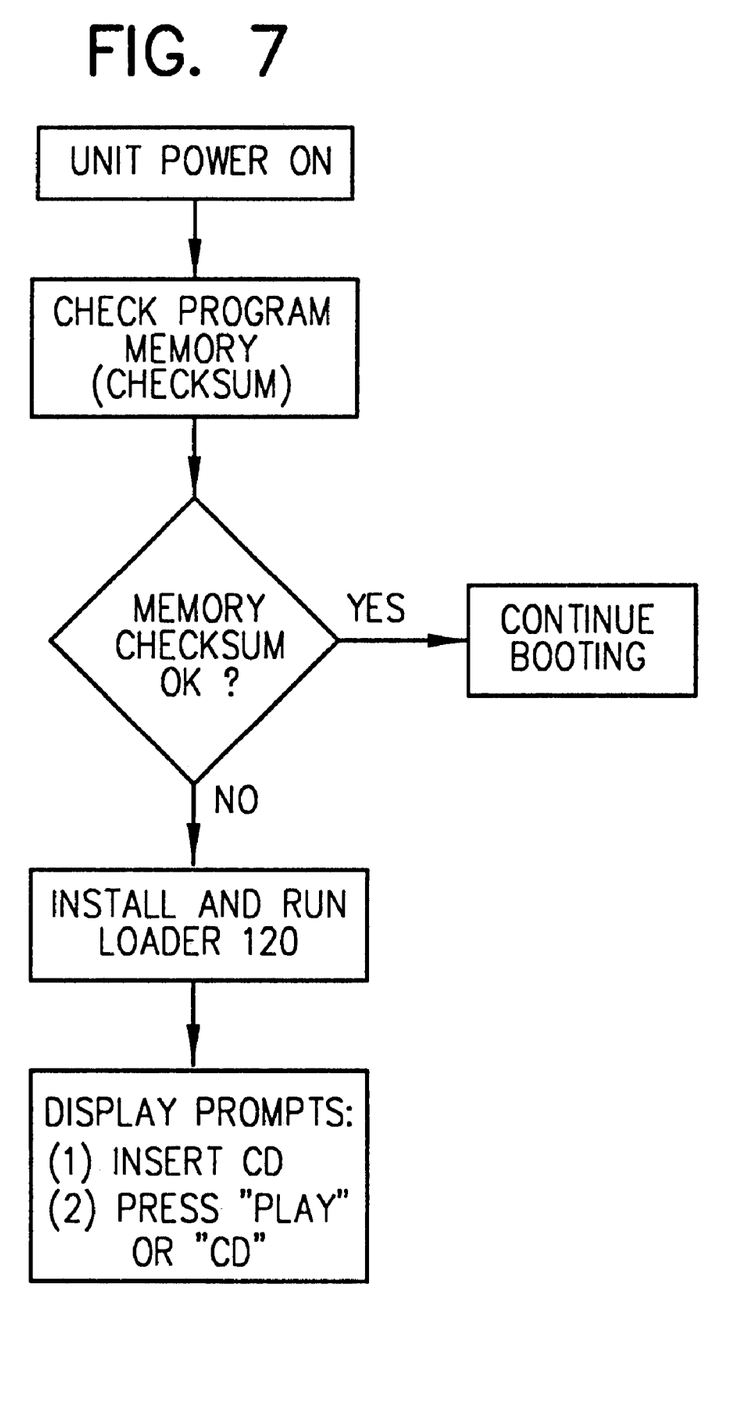
FIG. 7 is a flow diagram showing the steps automatically carried out when a disk is played in the FIG. 1 appliance.

If an error is detected, the user is prompted by a display on screen 32 to first insert the disc with the current program 121 and to then press either the PLAY button 128 of control complement 44 on the front panel 40 of module 24 or the CD button 70 on remote control 26. In either case, this results in the program 121 being reloaded into flash memory 110. As discussed above, errors will in almost all cases be found only if unit 24 is turned off while a program is being loaded or if a power surge is encountered during the loading process.

Figure 8:
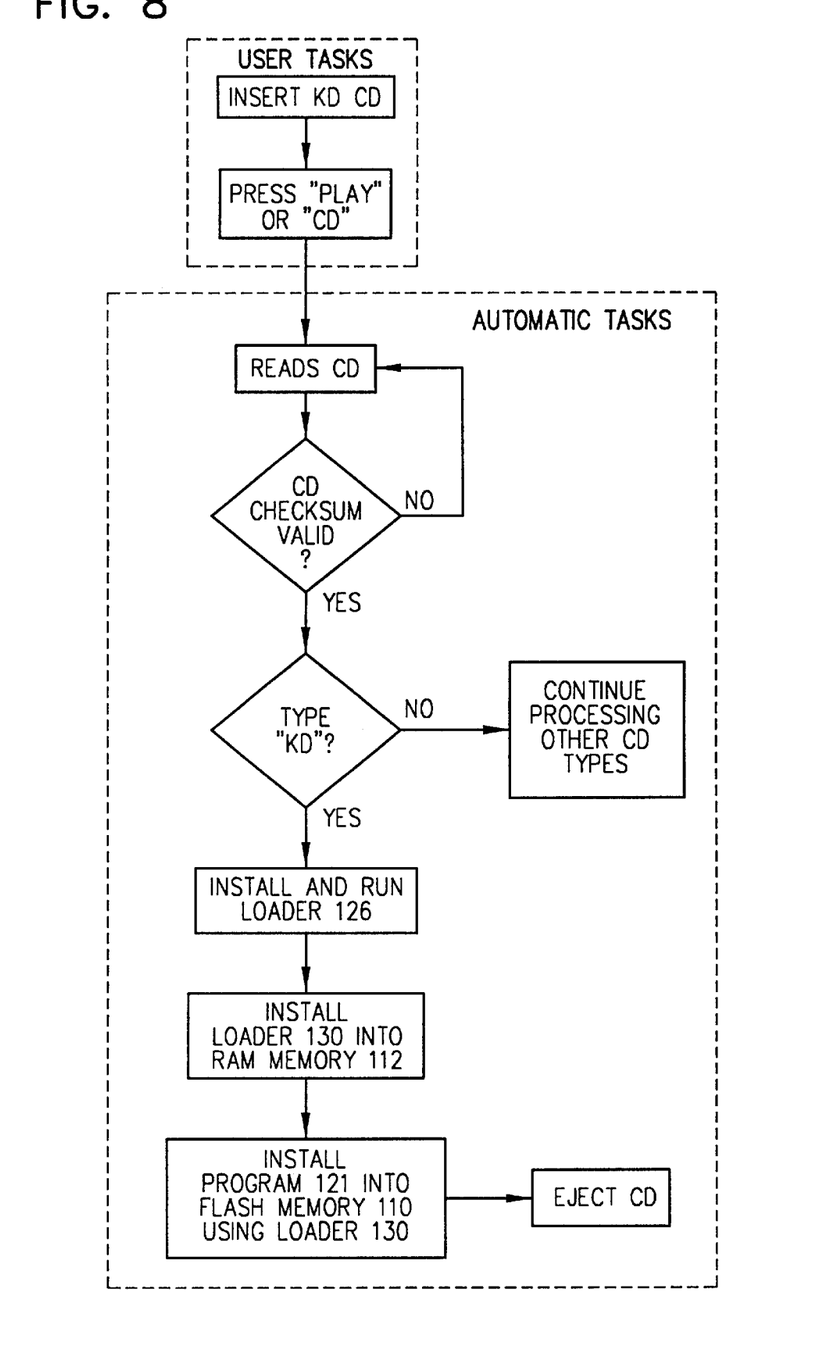
FIG. 8 is a flow diagram which shows the steps automatically carried out in upgrading the operating system of the FIG. 1 appliance.

Once the user presses PLAY button 127 or CD button 70, the loading of the program 121 is carried out automatically, the steps being shown in FIG. 8. These are the same irrespective of whether an existing program is being reloaded or a new program is being installed to upgrade the integrated unit 24.

Figure 6:
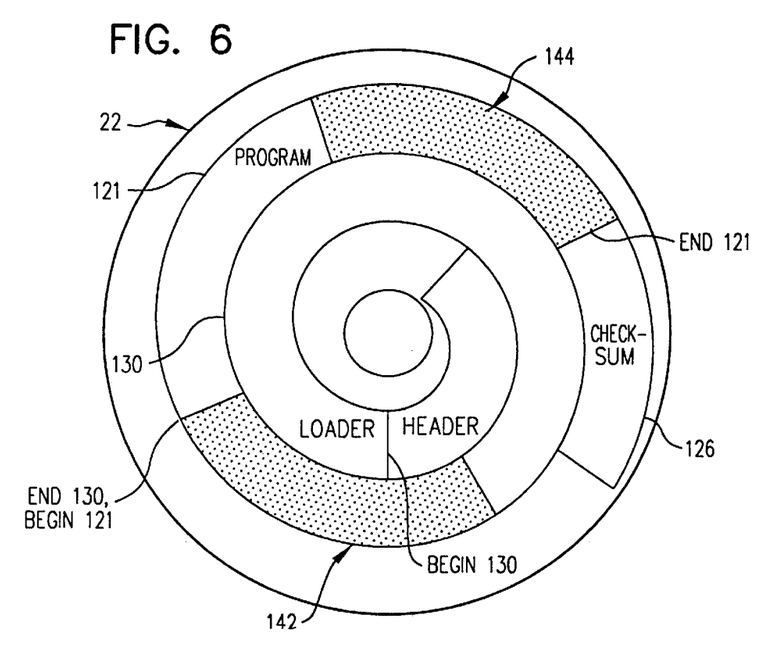
FIG. 6 is a pictorial view showing the contents of a laser readable disk which is of the character employed in accord with the principles of the present invention to upgrade the operating system of the FIG. 1 appliance.

First, the disk 128 which the user has loaded is read, and a second checksum is calculated as indicated by reference character 129 in FIG. 6. If the checksum is valid, the type of disk which has been loaded is identified. Disk's (hereinafter refered to as type "KD") are those which have upgrade programs. If that type of disk has been loaded, the simple loader 120 residing in flash memory 110 is loaded into RAM 112. The simple loader loads a more robust loader 130 (see FIG. 6) into RAM 112. The robust loader 130, in turn, loads the operating system 122 and application software 124 of program 121 into flash memory 110. Finally, the disc is ejected, indicating to the user the loading process is complete and that the application not present in flash memory 110 can be run.

As discussed above, a novel process is employed to produce the novel KD type disks discussed above as well as a variety of other optically readable disks. This process makes optimum use of conventional software and is depicted in flow diagram form in FIG. 9.

Figure 9:
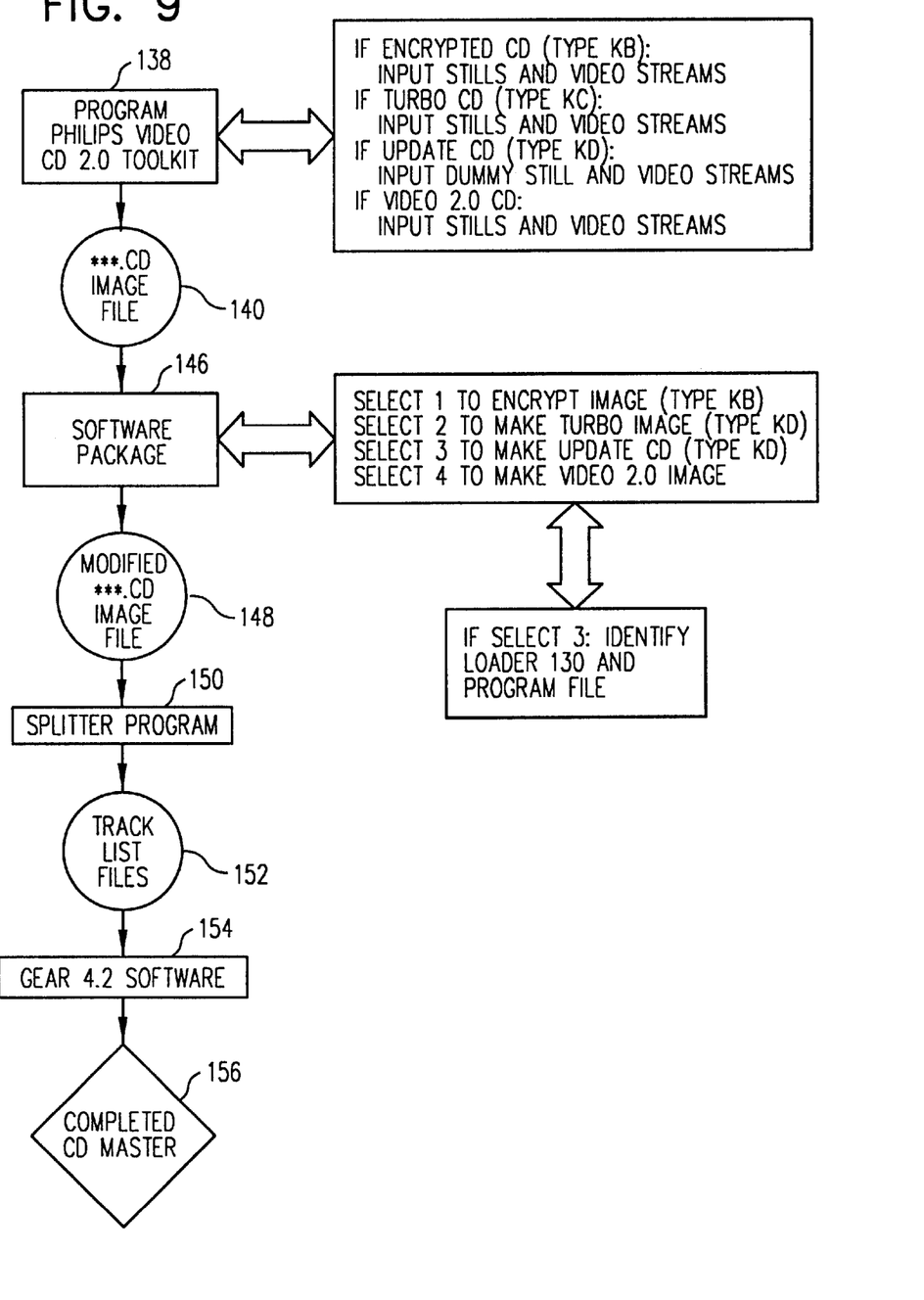
FIG. 9 is a flow diagram of the steps employed in producing an encoded disk as shown in FIG. 6.

The first step in making a KD type disk is to input to authoring software 138 such as Video Toolkit 2.0, two dummy images 142 and 144 which are respectively larger than the robust loader 130 and program 121 that are to appear on disk 22 [as suggested by the stippled areas 142a and 144a]. Based on this input, the authoring software generates a \*\*\*.CD file 140. Next, the \*\*\*.CD file with its dummy images 142 and 144 is inputted into a second software package 146, producing a modified \*\*\*.CD file 148 which is compatible with splitter software 150.

Referring still to FIG. 9, splitter software 150—also conventional—breaks the data in the \*\*\*.CD file 148 into a set of individual tracks (collectively identified in FIG. 9 by reference character 152) under the heading Track List Files and organizes those files into a format compatible with Gear or other conventional software 154 employed to drive the CD burner (not shown) and produce master disk 156.

As shown in FIG. 6, a KD type disk includes a header 158 in addition to loader 130 and program 121. The header is conventional. It includes such information as the type of disc, the location of the robust loader and program 121, etc.

As will be apparent to the reader, the present invention may be embodied in many forms without departing from the spirit or essential characteristics of the invention. The present embodiments are therefore to be considered in all respects as illustrative and not restrictive. The scope of the invention is indicated by the appended claims rather than by the foregoing description and the drawings; and all changes which come within the meaning and range of equivalency of the claims are intended to be embraced therein.

What is claimed is:

1. A method of upgrading the operating system of an appliance which has a controller with RAM and flash memory and a player for a laser readable disk, said method comprising the steps of:

loading the disk into the player;

playing the disk to retrieve a command which will result in a first loader residing in the flash memory being loaded into said RAM;

then employing said first loader to load a second more robust loader residing on said disk into said RAM; and then employing said second loader to load an operating system and/or application software stored on said disk into said flash memory.

2. A method as defined in claim 1 wherein software residing in volatile memory is checked for errors before the first loader is loaded into said RAM.

3. A method as defined in claim 1 wherein:

the appliance has multiple modes of operation; and an additional mode of operation is added or enabled.

4. A method of making a laser readable disk for use in a method as defined in claim 1, said method of making said disk comprising the steps of:

generating a ***.CD file based on dummy images;

modifying the *.CD file to produce a modified *.CD file which is compatible with a splitter software;

employing the splitter software to break the data in the ***.CD file into a plurality of track list files;

organizing the track list files in a format compatible with software employed to drive a CD burner; and burning in the data to produce a master disk.

5. A laser readable disk which:

is produced by a process as defined in claim 4; and has a header, said second loader, and said operating system and/or applications.

6. A method as defined in claim 1 wherein data on said disk is checked for errors before being loaded into said RAM.

* * * * *